(12) United States Patent
Hasegawa et al.

(10) Patent No.: US 7,953,141 B2
(45) Date of Patent: *May 31, 2011

(54) INTERFERENCE REDUCTION RECEIVER

(75) Inventors: Tsuyoshi Hasegawa, Kawasaki (JP);
Masahiko Shimizu, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

This patent is subject to a terminal disclaimer.

(21) Appl. No.: 11/889,654

(22) Filed: Aug. 15, 2007

(65) Prior Publication Data

US 2007/0291827 A1    Dec. 20, 2007

Related U.S. Application Data

(63) Continuation of application No. PCT/JP2005/002621, filed on Feb. 18, 2005.

(51) Int. Cl.
*H04B 1/69* (2011.01)
(52) U.S. Cl. ........ 375/148; 375/152; 375/343; 375/149; 375/150
(58) Field of Classification Search .................. 375/148, 375/152, 147, 343, 150, 149
See application file for complete search history.

(56) References Cited

U.S. PATENT DOCUMENTS

| | | | | |
|---|---|---|---|---|
| 6,714,585 B1* | 3/2004 | Wang et al. | | 375/148 |
| 6,934,323 B2* | 8/2005 | Hara | | 375/152 |
| 6,985,518 B2* | 1/2006 | Nielsen | | 375/152 |
| 7,298,774 B2* | 11/2007 | Miyata et al. | | 375/147 |
| 2003/0142640 A1* | 7/2003 | Pajukoski et al. | | 370/321 |
| 2005/0281358 A1* | 12/2005 | Bottomley et al. | | 375/343 |
| 2007/0177660 A1* | 8/2007 | Hasegawa | | 375/148 |

FOREIGN PATENT DOCUMENTS

| | | |
|---|---|---|
| JP | 2000-078111 | 3/2000 |
| JP | 2002-026868 | 1/2002 |
| JP | 2002-527927 | 8/2002 |
| JP | 2003-503879 | 1/2003 |
| JP | 2003-133999 | 5/2003 |
| JP | 2004-080555 | 3/2004 |
| JP | 2004-173793 | 6/2004 |
| JP | 2004-297408 | 10/2004 |
| WO | 00-21208 | 4/2000 |
| WO | 01-01595 | 1/2001 |

OTHER PUBLICATIONS

Tsuyoshi Hasegawa, et al., "Chokusetsu Kakusan Shingo no Sokan o Riyo shita MIXR Keisu no Kentor", 2003 Nen The Institute of Electronics, Information and Communication Engineers Tsushin Society Taikai Koen Ronbunshu 1, B-5-45, p. 422, Sep. 10, 2003, Fig. 2.

"General Rake Receiver for Interference Suppression" IEEE Journal on Selected Areas in Communications, vol. 18, No. 8, Aug. 2000; pp. 1536-1545.

* cited by examiner

*Primary Examiner* — Eva Y Puente
(74) *Attorney, Agent, or Firm* — Myers Wolin, LLC.

(57) ABSTRACT

An interference reduction receiver is disclosed. The interference reduction receiver includes a weight generating unit for obtaining weights by multiplying a signal correlation matrix of an input signal and a channel response vector. The input signal is despread at two or more predetermined timings, the despread signals are multiplied by the weights, the weight-multiplied signals are added, and an original signal is obtained.

10 Claims, 11 Drawing Sheets

FIG.13

| FINGER NUMBER # | TIMING |
|---|---|
| 1 | $t_{11}$ |
| 2 | $t_{12}$ |
| 3 | $t_{22}$ |
| 4 | $t_{21}$ |
| 5 | $t_{33}$ |
| 6 | $t_{44}$ |
| 7 | $t_{13}$ |
| 8 | $t_{55}$ |
| ⋮ | ⋮ |

INTERFERENCE REDUCTION RECEIVER

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2005/002621, filed on Feb. 18, 2005, the entire contents of which are hereby incorporated by reference.

BACKGROUND OF THE INVENTION

1. Field of the Invention

The present invention relates to an interference reduction receiver used in a CDMA (Code Division Multiple Access) communication system.

2. Description of the Related Art

Since multipath signals that arrive at a receiver of a communication system travel through various propagation paths having different delay times due to multiple reflections, the multipath signals work as interference signals that degrade receiving quality. Various methods have been proposed in an attempt to reduce the interference.

FIG. 1 shows the outline of a conventional equalizer where sample data (a chip or an over-sampled chip) are provided to a shift register 11. The sample data are obtained by A/D (Analog Digital) converting a CDMA input signal. Values of digits of the shift register 11 are multiplied by suitable weights $w_1$ through $w_n$ by corresponding multipliers 12, the weighted values are added by an adder 13, and an output is obtained by despreading with a predetermined spreading code by a correlation unit 14. Here, although a configuration using the shift register is illustrated in FIG. 1, the shift register may be replaced with other delaying means (the same is said of FIG. 2 and FIG. 3 that are described below).

Here, since the digits of the shift register 11 correspond to a time-axis of a delay profile 15 (impulse response) of the multipath signals, interference due to the multipath signals can be reduced by assigning suitable values to the weights $w_1$ through $w_n$ based on a channel estimated value of a pilot signal. According to the equalizer described above, the best characteristic is obtained; however, a disadvantage is that the amount of calculation is increased because the weights have to be multiplied by the digits of the sample data.

FIG. 2 shows the outline of a conventional RAKE receiver where the sample data obtained by A/D converting the input CDMA signal are provided to the shift register 11. Despreading is carried out by the correlation unit 14 using a spreading code obtained based on a value of a digit that corresponds to a time when a peak of the delay profile 15 is detected out of the digits of the shift register 11. Suitable weights $w_1$, $w_2$, and so on are multiplied by the multiplier 12, the multiplied results are added by the adder 13, and an output is obtained. According to the RAKE receiver, the advantage is that the amount of the multiplying calculations is decreased, compared with the equalizer described above; however, the disadvantage is that the characteristic is slightly degraded.

FIG. 3 shows the outline of a conventional G-RAKE (Generalized RAKE) receiver (for example, Patent References 1 and 2, and Non-Patent Reference 1), where another timing is used. This timing is effective for interference removal, in addition to the timing at which the peak of the delay profile 15 is detected as performed by the RAKE receiver shown in FIG. 2. According to the G-RAKE receiver, the amount of weight multiplication is decreased, compared with the equalizer described above, and the characteristic is close to the best; therefore, the G-RAKE receiver is considered to be promising for the interference reduction.

Further, a weight "w" of the G-RAKE receiver is obtained as follows. That is, where "y" is a vector that includes output signals (complex signals) of two or more correlation units 14 as components, "z" is an output signal (a complex signal) of the adder 13, and "w" is a vector of weight, z is expressed by $$z = w^H y$$

Here, H is the Hermitian transpose.

Further, where "s" is data transmitted by a specific user, "h" is a vector of a channel estimated value, and "n" is a vector of noise that includes thermal noise and multipath interference, y is expressed by $$y = hs + n$$

In order to remove the noise component n from the output signal z, a covariance matrix R expressed by the following formula is used.

$$R = E[nn^H]$$

(Here, E[ ] is an expected value.)

Then, the weight w is expressed as follows.

$$w = R^{-1} h$$

FIG. 4 is a block diagram showing an example of a circuit for obtaining a component $R_{ij}$ of a covariance matrix for the conventional G-RAKE receiver. With reference to FIG. 4, a correlation unit 21 despreads a pilot signal (CPICH: Common PIlot CHannel) included in the received data (chip data) at a timing $t_i$. An averaging unit 22 averages the despread signal. An adder 23 subtracts the averaged signal from the despread signal. Similarly, a correlation unit 24 despreads the pilot signal included in the received data at a timing $t_j$. An averaging unit 25 averages the despread signal. An adder 26 subtracts the averaged signal from the despread signal. Then, a multiplier 27 multiplies the output signals of the adder 23 and the adder 26. Then, an averaging unit 28 averages the multiplied signal, and the component $R_{ij}$ of the covariance matrix is obtained.

Further, a technique of reducing interference for the RAKE receiver is disclosed (for example, Patent References 3 and 4), where despreading is performed at a despreading timing that is called MICT (Multipath Interference Correlative Timing). Where two path signals are considered, the MICT is a timing that is in a symmetric location of one of the two path timings with reference to the other by a delay interval between the two path signals.

[Patent reference 1] JP 2002-527927 T
[Patent reference 2] JP 2003-503879 T
[Patent reference 3] JPA 2003-133999
[Patent reference 4] JPA 2004-173793
[Non-Patent Reference 1] Gregory E. Bottomley, Tony Ottosson, Yi-Pin Eric Wang, "A Generalized RAKE Receiver for Interference Suppression", IEEE JOURNAL ON SELECTED AREAS IN COMMUNICATIONS, VOL. 18, NO. 8, August 2000

DISCLOSURE OF INVENTION

Object of Invention

Although the G-RAKE receiver described above appears promising for the smaller amount of calculation than the equalizer method providing a comparable performance as the technique for interference reduction, a further highly efficient receiver is required for realization of a high-speed and great capacity radio transmission, such as HSDPA (High Speed Downlink Packet Access).

One of the reasons why the speed cannot be improved with the G-RAKE receiver is that the weights are obtained from the covariance matrix, wherein a known pilot signal must be used for obtaining the components of the covariance matrix as described above. That is, since the covariance matrix R is correlated with the noise component, the known pilot signal has to be deducted from the input signal.

If, for example, a spreading coefficient of the pilot signal is 256, only one set of data can be obtained every 256 chips. For this reason, in the covariance matrix, the weights cannot be obtained with satisfactory accuracy in a short time.

Further, there is no specific suggestion about effective timing for interference removal in Non Patent Reference 1; determining the effective timing in interference removal is an important matter.

SUMMARY OF THE INVENTION

The present invention was made in order to solve the problem described above, and provides an interference reduction receiver that can realize high speed and great capacity radio transmission by accurately obtaining the weights in a short time. Other objectives of the present invention include providing a method of determining a timing that is effective for interference removal.

Means for Solving the Problem

In order to solve the problem described above, the present invention provides a receiver wherein an input signal is despread at two or more predetermined timings, the despread signals are multiplied by corresponding predetermined weights, and the weighted signals are added such that the signal is demodulated. The receiver includes a weight generating unit for obtaining the weights that are products of a signal correlation matrix of the input signal and a channel response vector; thus, the receiver is called an interference reduction receiver.

Effectiveness of Invention

According to the interference reduction receiver of the present invention, the signal correlation matrix is used for obtaining the signal correlation matrix, hence, the weights. That is, a known pilot signal is not required. For this reason, weight values of sufficient accuracy can be obtained in a short time. If, for example, the spreading coefficient is 256, in the case of the conventional G-RAKE receiver using a known pilot signal, only one set of data can be obtained for every 256 chips; according to the present invention, 256 sets of data can be obtained for every 256 chips. In this way, sufficiently accurate values can be obtained in a short time. Further, for a CDMA downlink signal, all channels have the same signal correlation; accordingly, signals of all the channels can be used, which improves the accuracy of the signal correlation matrix.

BRIEF DESCRIPTION OF THE DRAWINGS

FIG. 13 is a table showing an example of determining the timings.

DESCRIPTION OF THE PREFERRED EMBODIMENTS

Hereafter, embodiments of the present invention are described.

<Configuration of CDMA Transceiver Apparatus>

Figure 1:
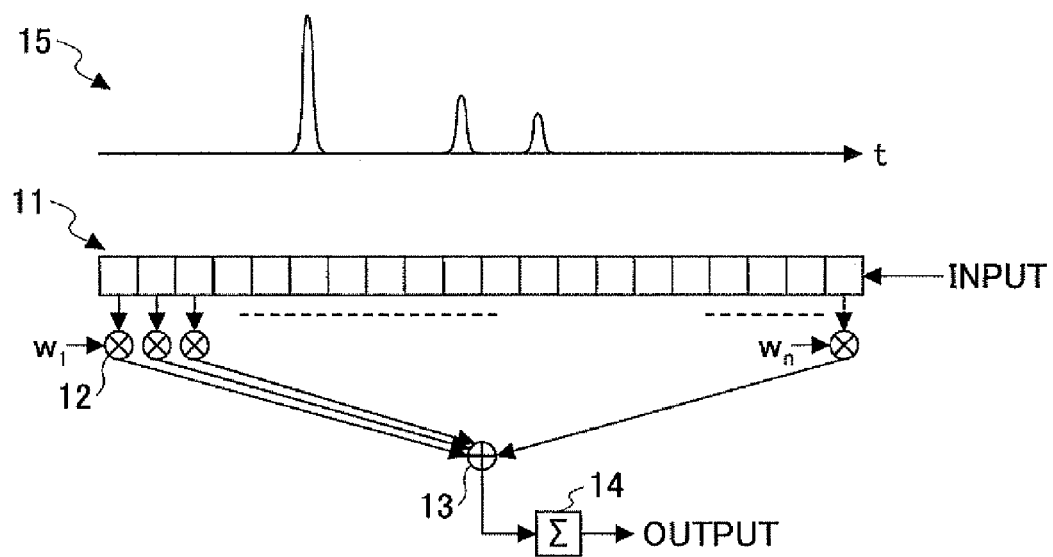
FIG. 1 is a schematic drawing showing the outline of a conventional equalizer.
Figure 2:
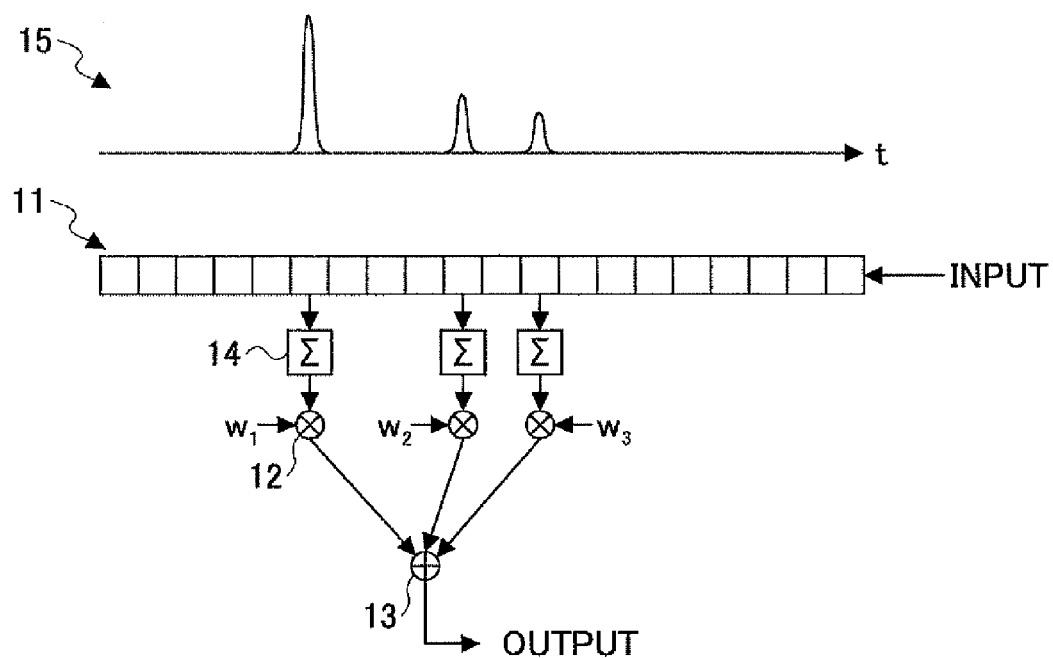
FIG. 2 is a schematic drawing showing the outline of a conventional RAKE receiver.
Figure 3:
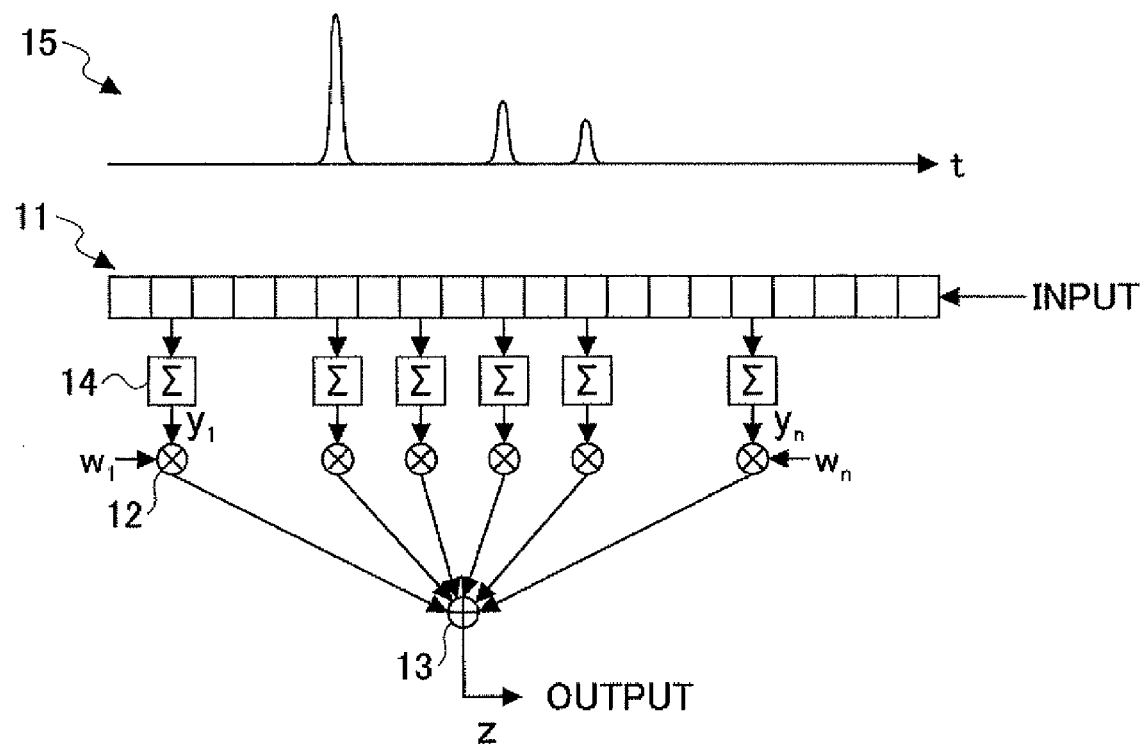
FIG. 3 is a schematic drawing showing the outline of a conventional G-RAKE receiver.
Figure 4:
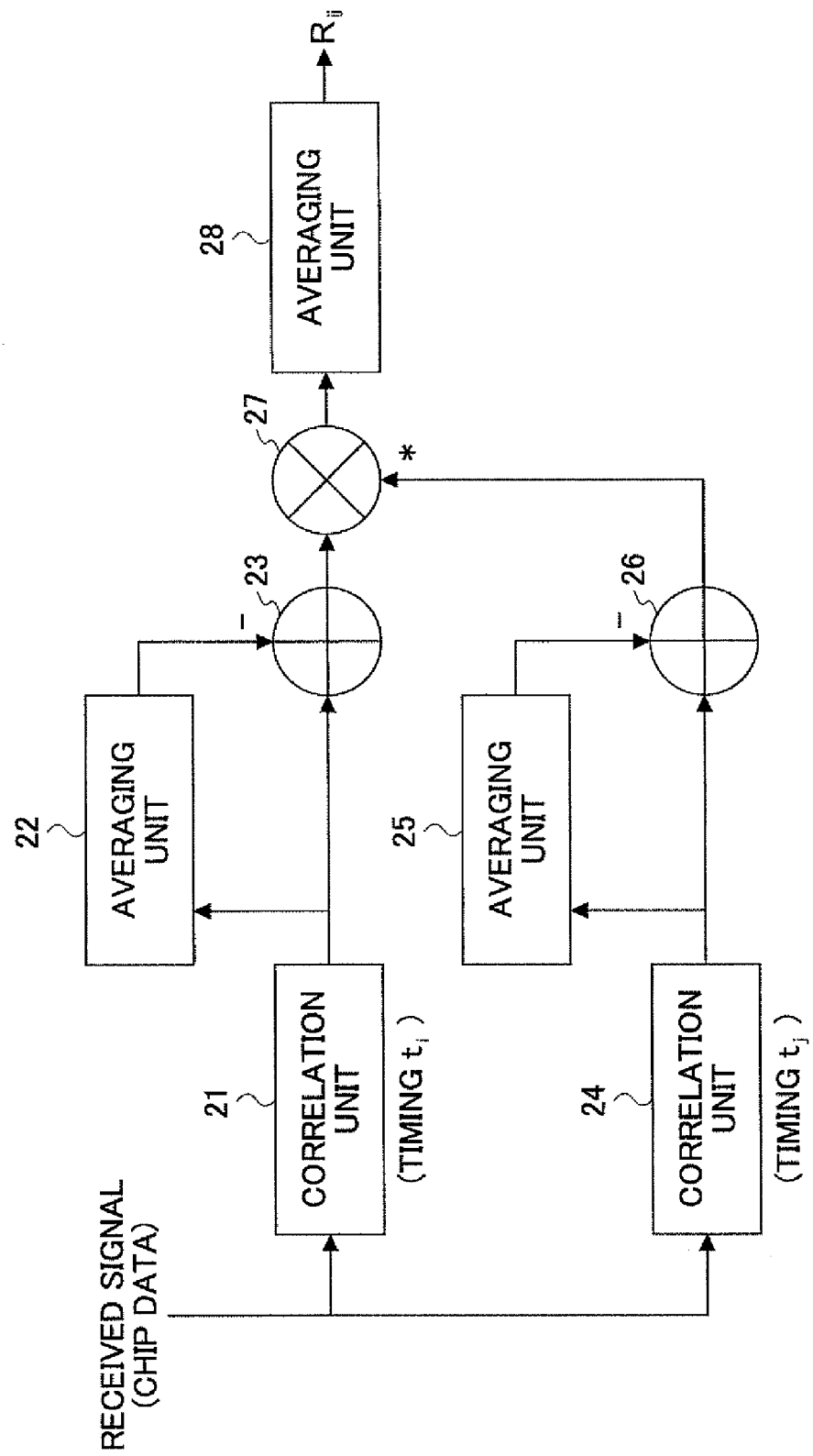
FIG. 4 is a block diagram showing an example of a circuit of the conventional G-RAKE receiver for obtaining a component of a covariance matrix.
Figure 5:
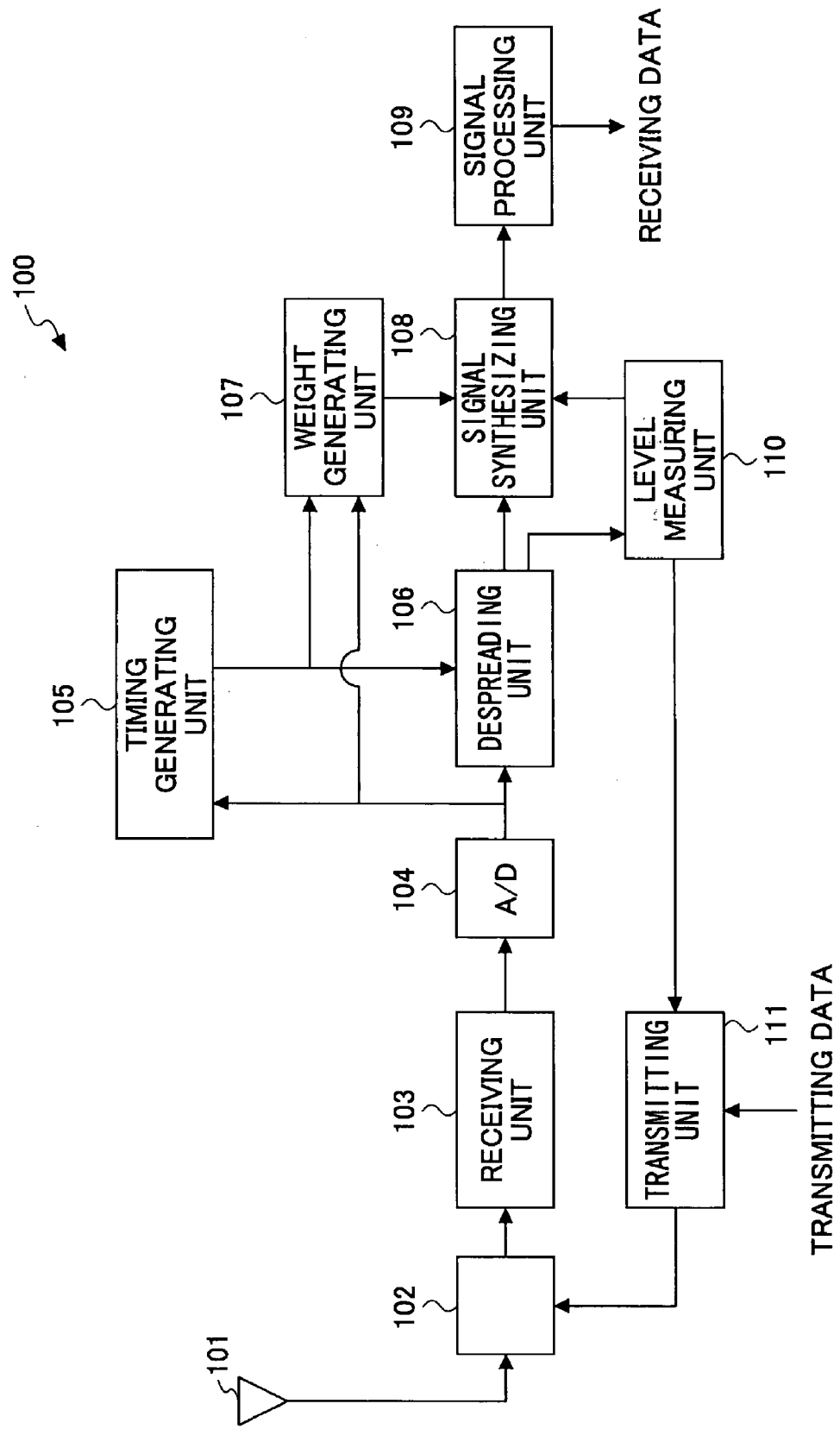
FIG. 5 is a block diagram showing an example of a circuit of a CDMA transceiver apparatus according to an embodiment of the present invention.

FIG. 5 shows an example of the circuit configuration of a CDMA transceiver apparatus according to the embodiment of the present invention. In FIG. 5, a radio signal is received with an aerial 101, goes through a duplexer 102, is provided to a receiving unit 103, and is converted into a digital signal (sample data) by an A/D converter 104. The sample data are provided to a timing generating unit 105 and to a despreading unit 106. The sample data are despreaded by two or more fingers of the despreading unit 106 according to timings generated by the timing generating unit 105. Further, the sample data of the A/D converter 104 and the timings of the timing generating unit 105 are also provided to a weight generating unit 107 wherein weights corresponding to the fingers of the despreading unit 106 are generated. The despread output signals of the fingers of the despreading unit 106 are added by a signal synthesizing unit 108 according to the corresponding weights provided by the weight generating unit 107. The added signal is provided to a signal processing unit 109, wherein channel decoding, etc., are performed, and received data are obtained.

Further, the despreading signal output by the despreading unit 106 is provided to a level measuring unit 110, and feedback control is applied to the signal synthesizing unit 108 according to the signal level. The level measuring unit 110 controls output power of a transmit unit 111 that modulates transmit data, and transmits the modulated transmitting data through the duplexer 102 and the aerial 101.

<Details of Timing Generating Unit, etc.>

Figure 6:
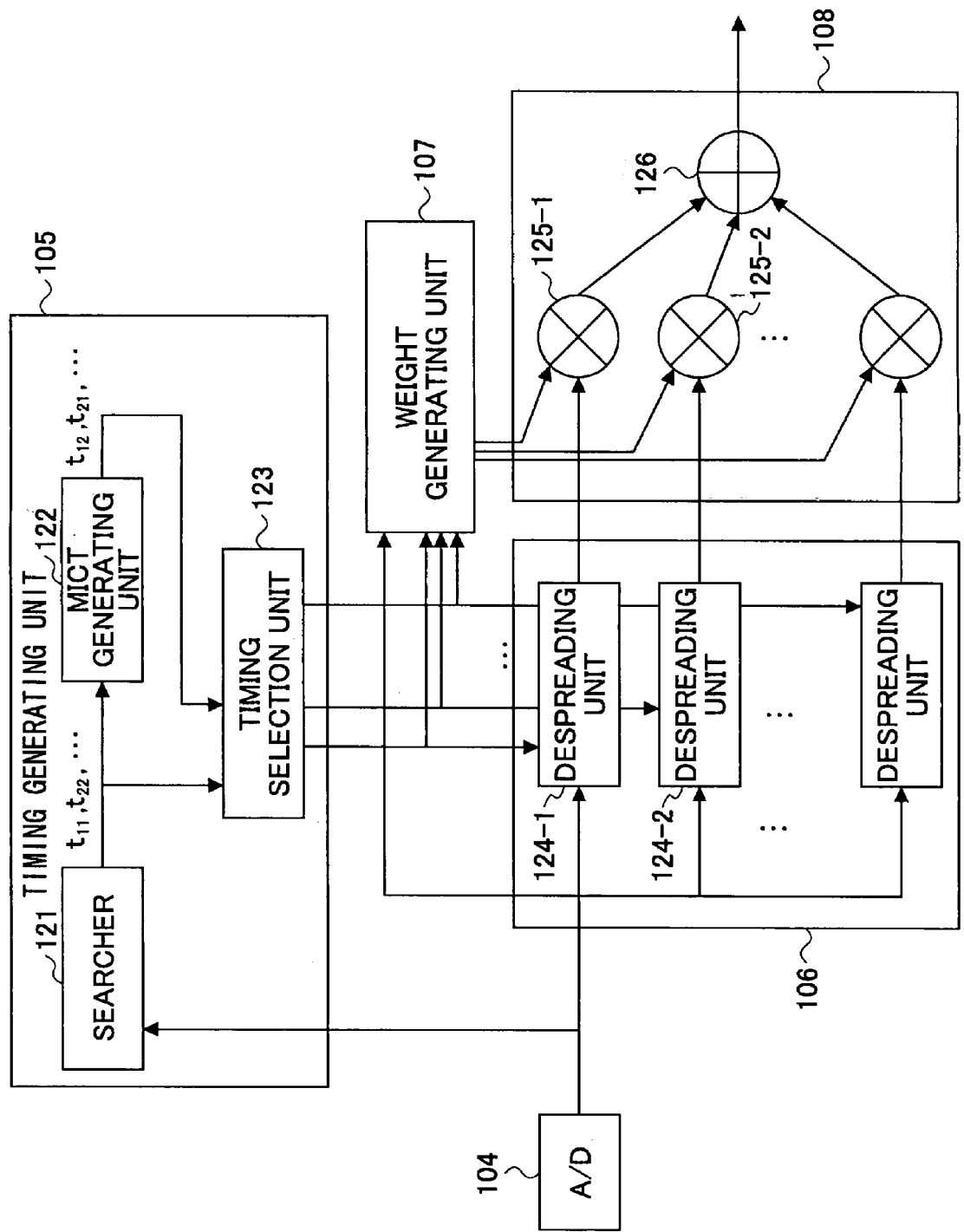
FIG. 6 is a block diagram showing details of a timing generating unit, a despreading unit, and a signal synthesizing unit.

FIG. 6 shows details of the timing generating unit 105, the despreading unit 106, and the signal synthesizing unit 108 illustrated in FIG. 5. The timing generating unit 105 includes a searcher 121 for generating timings $t_{11}$, $t_{22}$, and so on corresponding to delay times of an impulse response due to one or more paths of the sample data that are provided by the A/D converter 104 in FIG. 6. Here, since the timings are those of the RAKE receiver, they are called "RAKE timings". The timing generating unit 105 includes a MICT generating unit 122 for generating path timings (MICT) $t_{12}$, $t_{21}$, and so on that are symmetrically located with reference to one of two path timings by the delay time between corresponding two paths. The timing generating unit 105 includes a timing selection unit 123 for selecting a suitable timing out of the RAKE timings of the searcher 121 and the MICT of the MICT generating unit 122.

The despreading unit 106 includes despreading units 124-1, 124-2, and so on, constituting fingers.

The signal synthesizing unit 108 includes an adder 126, multipliers 125-1, 125-2, and so on, which multipliers multiply the despread outputs and the weights for the corresponding fingers, which despread outputs are provided by the despreading units 124-1, 124-2, and so on of the despreading unit 106. The weights are provided by the weight generating unit 107. The adder 126 adds the outputs of the multipliers 125-1, 125-2, and so on.

<Details of Weight Generating Unit>

Figure 7:
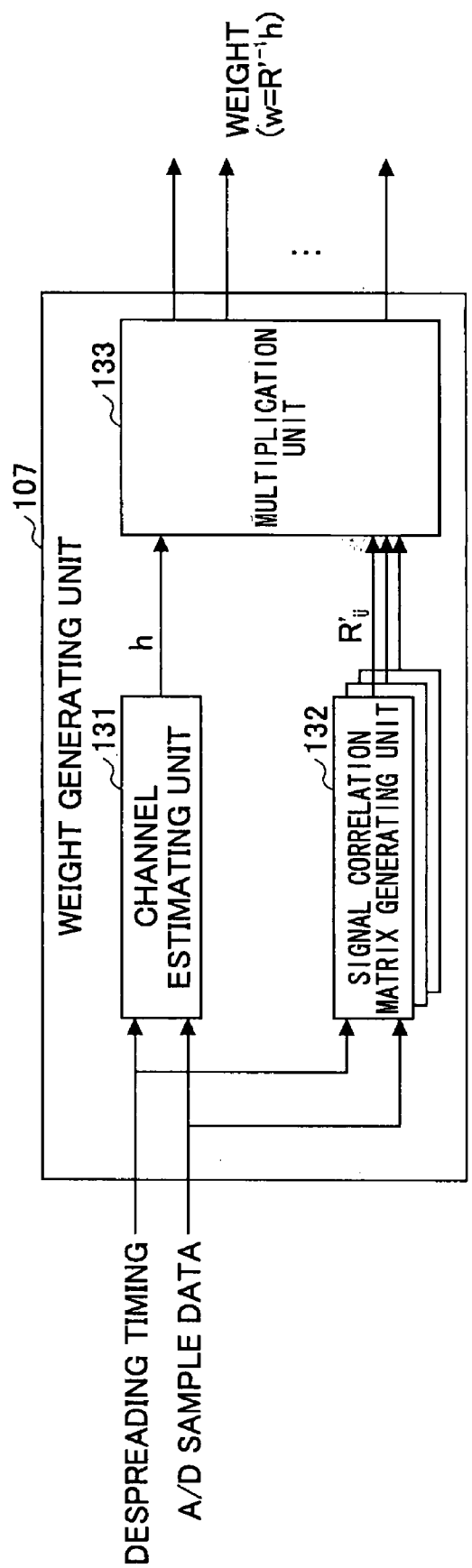
FIG. 7 is a block diagram showing details of a weight generating unit.

FIG. 7 shows details of the weight generating unit 107 illustrated in FIG. 5. The weight generating unit 107 includes a channel estimation unit 131 for estimating a channel based on the timings provided by the timing generating unit 105 and the sample data provided by the A/D converter 104, and for generating a channel response vector h. The weight generating unit 107 includes signal correlation matrix generating units 132 for calculating components $R'_{ij}$ of a signal correlation matrix based on the sample data provided by the A/D converter 104 and the timings provided by the timing generating unit 105. The weight generating unit 107 further includes a multiplication unit 133 for generating $R'^{-1}$ from the signal correlation matrix $R'$ generated by the signal correlation matrix generating units 132, and for multiplying the $R'^{-1}$ and the channel response vector h generated by the channel estimation unit 131 such that the weights w may be generated.

<Details of Signal Correlation Matrix Generating Unit>

Figure 8:
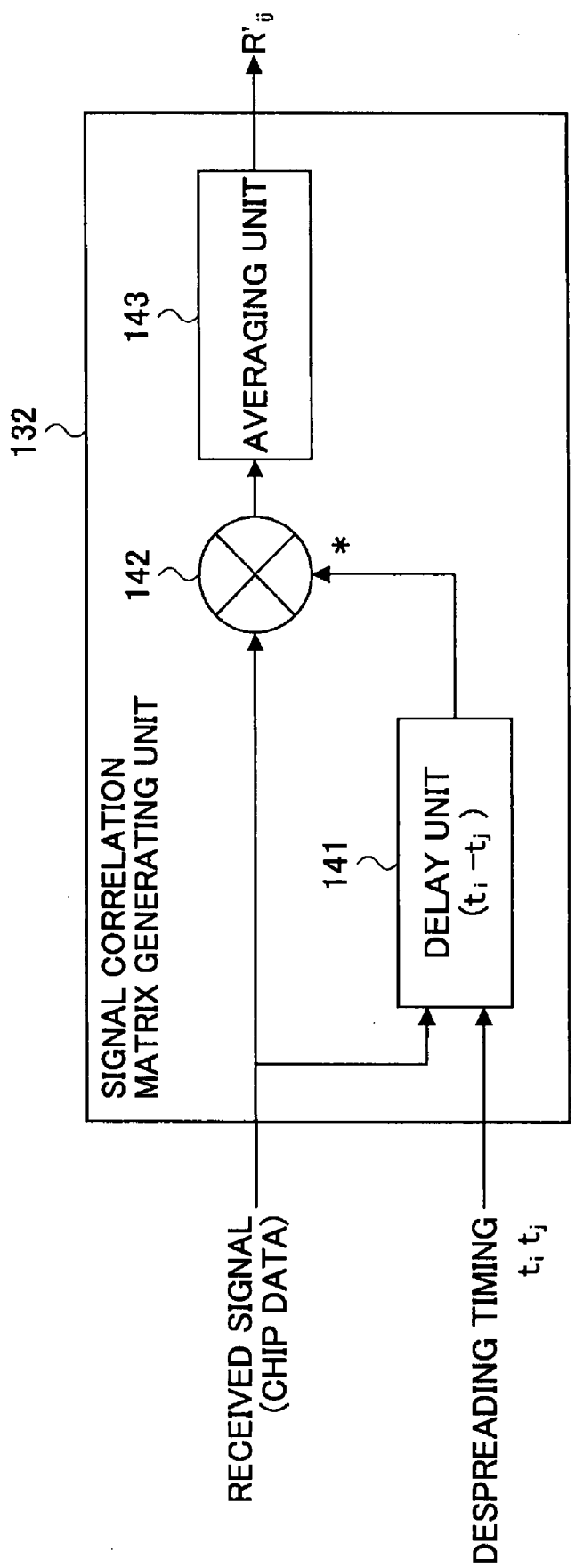
FIG. 8 is a block diagram showing details of a signal correlation matrix generating unit.

FIG. 8 shows details of the signal correlation matrix generating unit 132 illustrated in FIG. 7. The signal correlation matrix generating unit 132 includes a delay unit 141 for delaying the sample data provided by the A/D converter 104 by a time equal to the difference between a first timing $t_i$ and a second timing $t_j$ provided by the timing generating unit 105. The signal correlation matrix generating unit 132 includes a multiplier 142 for multiplying the sample data provided by the A/D converter 104 and the output signal of the delay unit 141. The signal correlation matrix generating unit 132 further includes an averaging unit 143 for averaging an output signal of the multiplier 142 such that the components $R'_{ij}$ of the signal correlation matrix may be obtained.

Here, the components $R'_{ij}$ of the signal correlation matrix are obtained by the signal correlation matrix generating units 132 for all of the sample data; however, the components $R'_{ij}$ of the signal correlation matrix may be obtained only from sampled sets of the sample data so that the amount of calculation may be reduced. Here, sampling is carried out at a predetermined interval. Where "p" represents a sample data number, v(p) represents a sample data signal, and "*" represents a complex conjugate, when the components $R'_{ij}$ of the signal correlation matrix are obtained for all the sample data, $$R'_{ij} = \Sigma_p v(p) \times v^*(p + t_i - t_j)$$

When the components $R'_{ij}$ of the signal correlation matrix are obtained on a sample basis, e.g., for every five samples, $$R'_{ij} = \Sigma_p v(p \times 5) \times v^*(p \times 5 + t_i - t_j)$$

<Comparison of Weight by Signal Correlation Matrix with Weight by Covariance Matrix>

Next, relationships between the signal correlation matrix R' used in the present invention and the covariance matrix R used in the conventional G-RAKE receiver are described.

Here, the input signal (sample data) at a certain timing $t_i$ is $v_i$, and $v_i$ is expressed by the following Formula 1.

[Formula 1]

$$v_i = \sum_{k=-\infty}^{\infty} a_k h(t_i - kT) + n_i \quad (1)$$

Here, "$a_k$" represents a chip series after spreading, "h( )" represents an impulse response, "$n_i$" represents a noise, and "T" represents a chip duration. The $v_i$ includes the sum of the impulse responses of the signal of each chip. At the timing $t_i$, correlation between the input signal $v_i$ at the timing $t_i$ and an input signal $v_j$ at a timing $t_j$ is expressed by the following Formula 2.

[Formula 2]

$$\langle v_i v_j^* \rangle = \left\langle \left( \sum_{k=-\infty}^{\infty} a_k h(t_i - kT) + n_i \right) \left( \sum_{l=-\infty}^{\infty} a_l h(t_j - lT) + n_j \right)^* \right\rangle \quad (2)$$

$$= \sum_{k=-\infty}^{\infty} \sum_{l=-\infty}^{\infty} \langle a_k a_l^* \rangle h(t_i - kT) h^*(t_j - lT) + \langle n_i n_j^* \rangle$$

$$= \sum_{k=-\infty}^{\infty} \langle |a_k|^2 \rangle h(t_i - kT) h^*(t_j - kT) + \langle n_i n_j^* \rangle$$

Here, <x> is an average value of x. Further, the fact that $a_k$, $a_l$, $n_k$, and $n_l$ are not mutually correlated is used.

Formula 2 expresses the signal correlation matrix according to the present invention. Formula 2 can be simplified by making the average power of $a_k$ into 1 as shown by the following Formula 3.

[Formula 3]

$$R'_{ij} = \sum_{k=-\infty}^{\infty} h(t_i - kT) h^*(t_j - kT) + \langle n_i n_j^* \rangle \quad (3)$$

Next, a description follows about the interference and the noise component of the input signal $v_i$. Here, a chip series $a_0$ is considered to represent a target signal. Out of $v_i$, only $a_0$ is a desired signal, and others are either interference signals or noise. Accordingly, $a_0$ is deducted from the $v_i$ for obtaining an interference and noise component $I_i$. Accordingly, the summation excludes k=0.

[Formula 4]

$$I_i = \sum_{\substack{k=-\infty \\ k \neq 0}}^{\infty} a_k h(t_i - kT) + n_i \qquad (4)$$

The correlation of the $I_i$ in this case is expressed by the following Formula 5.

[Formula 5]

$$\langle I_i I_j^* \rangle = \sum_{\substack{k=-\infty \\ k \neq 0}}^{\infty} \langle |a_k|^2 \rangle h(t_i - kT) h^*(t_j - kT) + \langle n_i n_j^* \rangle \qquad (5)$$

Formula 5 expresses the covariance matrix used by the conventional G-RAKE receiver, which formula 5 can be simplified by making the average power of $a_k$ into 1 as given by the following Formula 6.

[Formula 6]

$$R_{ij} = \sum_{\substack{k=-\infty \\ k \neq 0}}^{\infty} h(t_i - kT) h^*(t_j - kT) + \langle n_i n_j^* \rangle \qquad (6)$$

Here, the correlation of the noise is obtained with the signal before despreading. However, the correlation of the noise can be obtained with the signal after despreading, in which case, all the components are multiplied by a SF (Spreading Factor), which makes no essential difference.

Based on Formulas 3 and 6, the following is obtained.

$$R = R' - hh^H$$

If the weight obtained by the covariance matrix is "w", and the weight obtained by the signal correlation matrix is "w'", the following relationships are obtained, given that $Rw=h$ and $R'w'=h$.

$$R'w = hh^H w + h$$

$$R'w = h(h^H w + 1)$$

$$w = w'(h^H w + 1)$$

Accordingly, the weights are equivalent with only multiplication by a scalar value. Therefore, the speed of convergence to the average number of the matrix component is of the same magnitude. That is, the signal correlation matrix can be obtained faster than the covariance matrix by almost spreading factor times.

Figure 9:
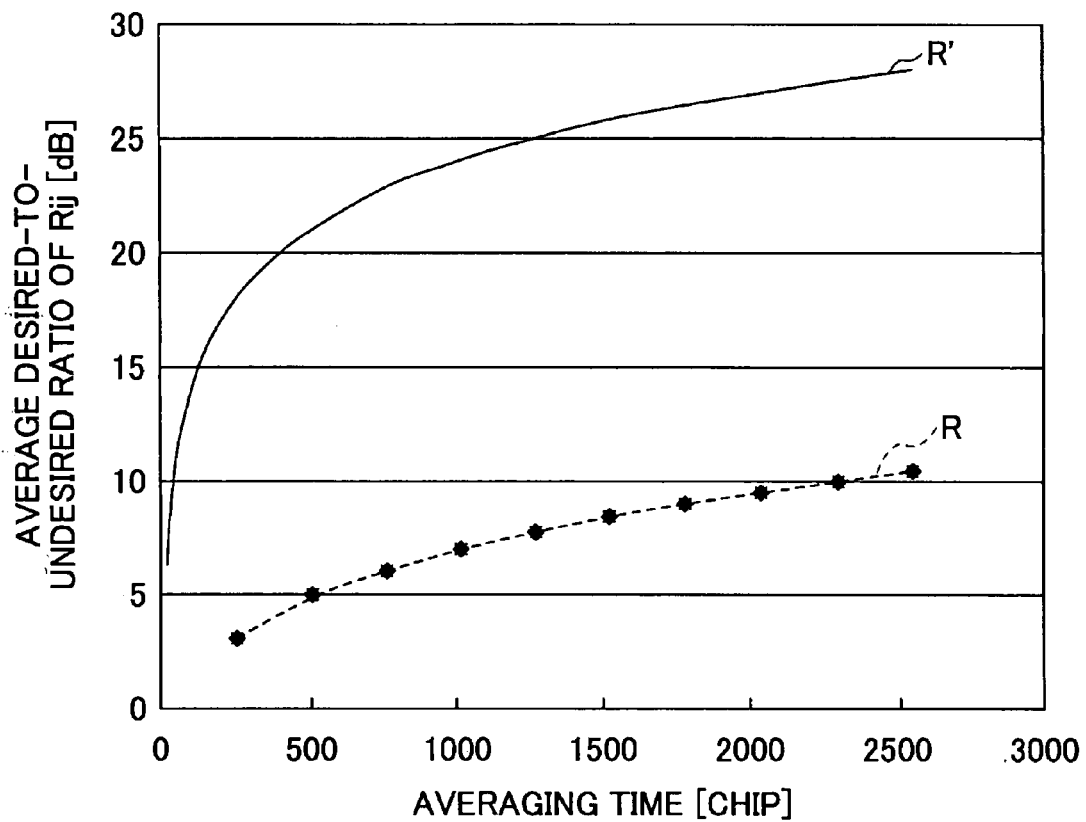
FIG. 9 is a graph showing an example of relationships between an averaging time of a chip and reliability of a matrix calculation value.

FIG. 9 is a graph showing an example of relationships between the averaging time of a chip and the reliability of a matrix calculation value. The graph illustrates the case where three paths providing the same signal intensity are present. As shown in FIG. 9, the signal correlation matrix R' according to the present invention (a continuous line) provides greater accuracy (reliability) than the covariance matrix R (a broken line) used in the conventional G-RAKE receiver even if the averaging time is small.

<Selection of Despreading Timing>

Next, selection of the timing carried out by the timing generating unit 105 of FIGS. 5 and 6 is explained.

Figure 10:
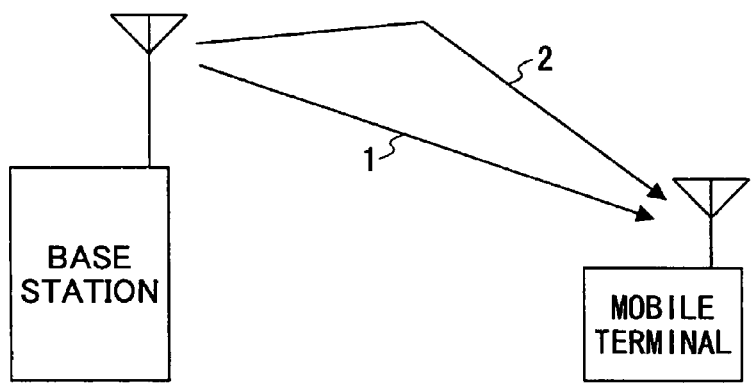
FIG. 10 is a schematic diagram showing conceptual multi-paths between a base station and a mobile terminal.
Figure 11:
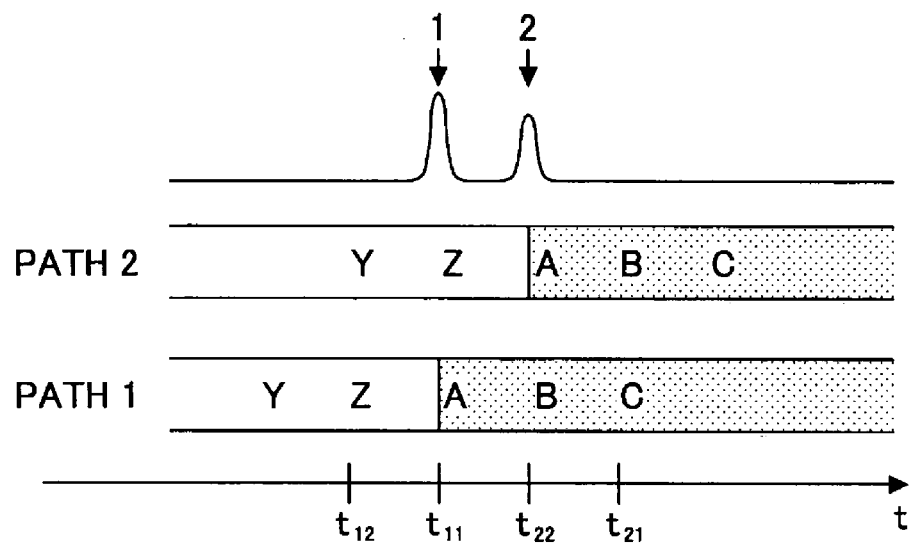
FIG. 11 is a schematic drawing showing an example of relationships between an impulse response of a path and a despreading timing.

FIG. 10 conceptually shows multi-paths between a base station and a mobile terminal, where a path 1 and a path 2 are present. FIG. 11 shows an example of relationships between the impulse responses of the paths 1 and 2 in the environment shown in FIG. 10, and the despreading timings. There, the RAKE timings $t_{11}$ and $t_{22}$ and the MICT timings $t_{12}$ and $t_{21}$ are detected. Here, the MICT timing $t_{12}$ is located in symmetry with the timing $t_{22}$ each at a distance equal to the delay between the two paths 1 and 2 from the timing $t_{11}$ that serves as a point of symmetry. By adding a finger for despreading at the timing $t_{12}$, the component of the path 2 included in the signal despread at the timing $t_{11}$ can be cancelled. In other words, the signal that is despread at the timing $t_{11}$ includes a desired signal that is a chip A of the path 1 despreaded, and an undesired interference component that is a chip Z of path 2 despread. The added finger despreads at the timing $t_{12}$, and the interference component due to the chip Z is obtained from the path 1; this interference component is used to cancel the undesired interference component due to the chip Z of the path 2. The same is true of the relationship between the timing $t_{22}$ and the timing $t_{21}$.

Figure 12:
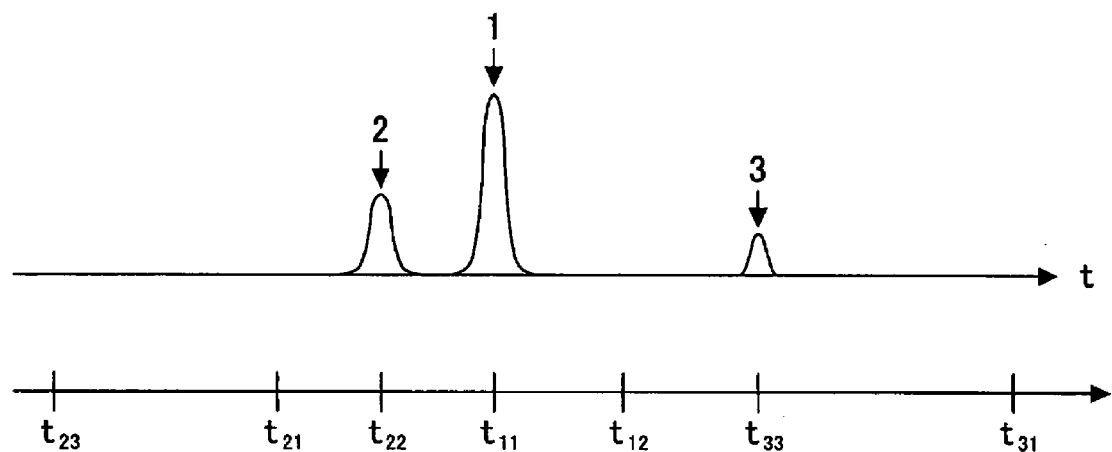
FIG. 12 is a schematic drawing showing an example of timings.

FIG. 12 shows an example of timings where three paths 1, 2, and 3 are present. Timings available for despreading include the RAKE timings $t_{11}$, $t_{22}$, and $t_{33}$, the MICT timings $t_{12}$, $t_{21}$, and so on. Then, the timings are placed in a table as shown in FIG. 13 where the timings are listed in a sequence of effectiveness for the interference removal determined by theory and/or on experiences. The timing selection unit 123 (FIG. 6) of the timing generating unit 105 sequentially assigns timings from the table, starting with the highest ranked timing, according to the number of the fingers that can be used so that an optimal timing may be used.

<Another Example of Weight Generating Unit>

Figure 14:
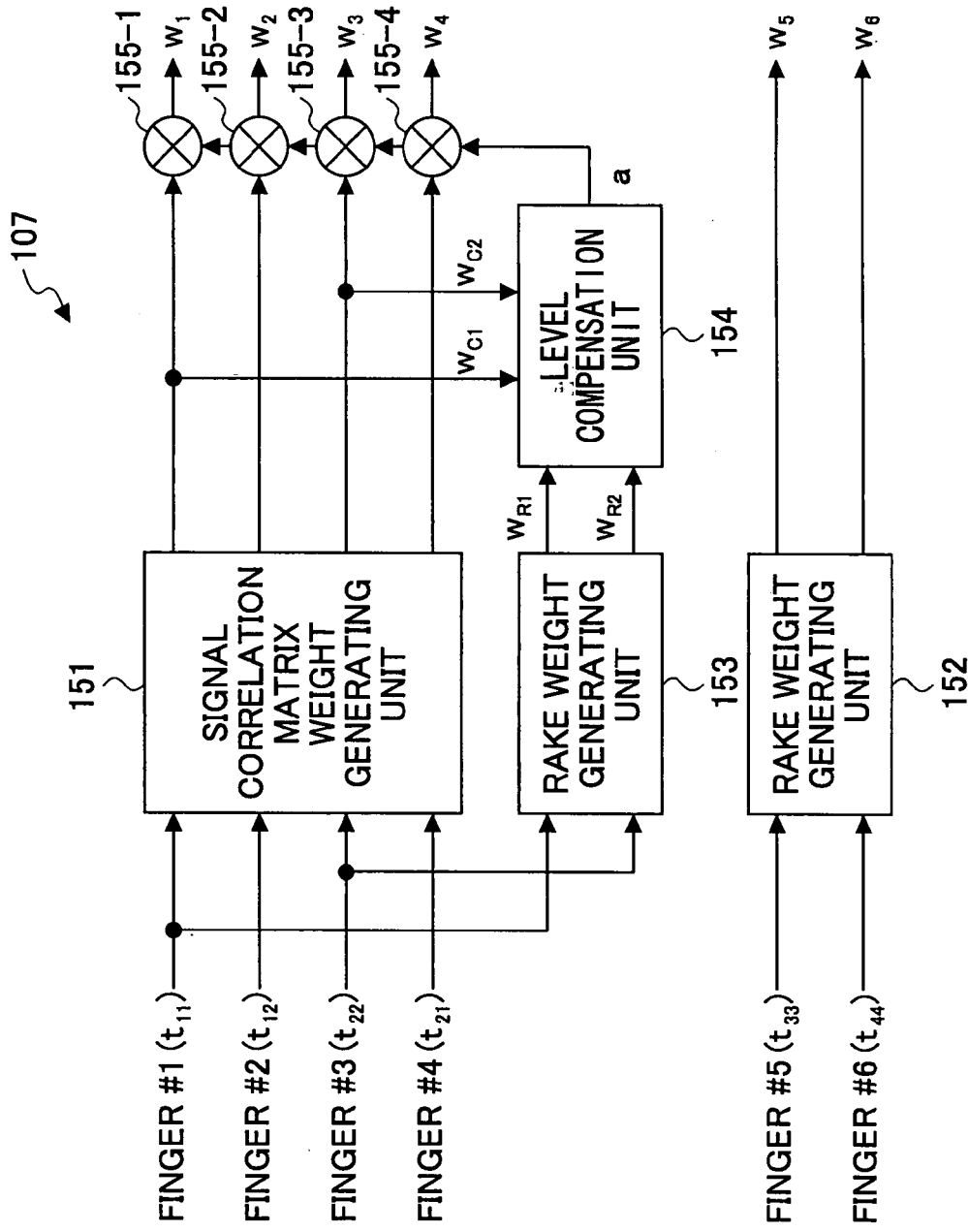
FIG. 14 is a block diagram showing another example of the weight generating unit.

FIG. 14 is a block diagram of another example of the weight generating unit 107 (ref. FIGS. 5, 6, and 7), where operational throughput is improved by reducing the amount of calculations. Specifically, a part of the weights corresponding to the fingers is obtained by the usual RAKE method. That is, although the weights are obtained with high accuracy in a short time based on the signal correlation matrix according to the present invention, since the amount of calculations is somewhat increased, the usual RAKE method is used for the timings that are lower ranked.

As shown in FIG. 14, the weight generating unit 107 includes a signal correlation matrix weight generating unit 151 for generating weights based on a signal correlation matrix based on the timings $t_{11}$, $t_{12}$, $t_{22}$, and $t_{21}$ corresponding to fingers #1 through #4, respectively, and a RAKE weight generating unit 152 for generating weights by the usual RAKE method based on timings $t_{33}$ and $t_{44}$ corresponding to fingers #5 and #6, respectively.

Further, in order to align the level of the weights generated based on the signal correlation matrix and the weights generated by the usual RAKE method, using the RAKE weight generating unit 153 for generating weights by the usual RAKE method based on the timings $t_{11}$ and $t_{22}$ corresponding to the fingers #1 and #3 that becomes RAKE timings out of the fingers #1 through #4, a ratio of the absolute values of the weights obtained by the signal correlation matrix weight generating unit 151 based on the same timings, and the weights obtained by the RAKE weight generating unit 153 is calculated.

The weight generating unit 107 further includes a level compensation unit 154 for aligning the levels with multipliers

155-1 through 155-4. Here, the calculation of the ratio by the level compensation unit 154 is performed according to the following formula.

[Formula 7]

$$a = \sqrt{\frac{|w_{R1}|^2 + |w_{R2}|^2}{|w_{C1}|^2 + |w_{C2}|^2}} \times b$$

Here, the denominator represents the total power of the weights at the RAKE timings out of the weights generated based on the signal correlation matrix, and the numerator represents the total power of the weights generated by the usual RAKE method at the RAKE timings corresponding to the denominator. Here, "b" is a suitable coefficient such as a constant ½ or 2. In addition, it is desirable to carry out the level compensation such that the weights generated based on the signal correlation matrix, which weights are more accurate, may have a slightly greater level than the weights generated by the usual RAKE method, rather than both levels being precisely aligned.

In the above, the embodiment of the present invention is described. Although the examples are specifically described, it is clear that various variations and modifications can be applied to the examples without deviating from the extensive scope and range of the present invention as claimed below. That is, it should not be interpreted that the present invention is limited to the specificity of the examples and the attached drawings.

Further, the present invention is not limited to these embodiments, but variations and modifications may be made without departing from the scope of the present invention.

What is claimed is:

1. An interference reduction receiver, comprising:
   a signal correlation matrix obtaining unit configured to obtain a signal correlation matrix separate from despreading based on an input signal;
   a weight generating unit configured to generate weights by multiplying the signal correlation matrix of the input signal by a channel response vector; and
   a demodulating unit configured to demodulate a signal by despreading the input signal at a plurality of predetermined timings to obtain despread signals, multiplying the despread signals by the weights to obtain weight-multiplied signals, and adding the weight-multiplied signals;
   a delay unit configured to provide a time delay to the input signal, the time delay being equal to a difference between a first path timing and a second path timing;
   a multiplication unit configured to multiply the input signal and an output signal of the delay unit;
   an averaging unit configured to average an output signal of the multiplication unit to obtain components of the signal correlation matrix corresponding to the first path timing and the second path timing.

2. The interference reduction receiver as claimed in claim 1, wherein
   the signal correlation matrix is obtained for all samples of the input signal.

3. The interference reduction receiver as claimed in claim 1, wherein
   samples are taken out of the input signal with predetermined time spacing, and the signal correlation matrix is obtained for the taken-out samples.

4. The interference reduction receiver as claimed in claim 1, wherein
   the predetermined timings at which despreading is carried out include a timing that corresponds to an impulse response generating delay time of a signal of one or more paths, the signal being included in the input signal.

5. The interference reduction receiver as claimed in claim 1, wherein
   the predetermined timings at which despreading is carried out include a timing that is located at a symmetric location of a path timing of one of two paths with reference to a path timing of the other.

6. An interference reduction receiver, comprising:
   a signal correlation matrix obtaining unit configured to obtain a signal correlation matrix based on an input signal before being despread;
   a weight generating unit configured to generate weights by multiplying the signal correlation matrix of the input signal by a channel response vector;
   a demodulating unit configured to demodulate a signal by despreading the input signal at a plurality of predetermined timings to obtain despread signals, multiplying the despread signals by the weights to obtain weight-multiplied signals, and adding the weight-multiplied signals; and
   a timing selection unit that comprises a table that lists
      a timing that corresponds to an impulse response generating delay time of a signal of one or more paths, the signal being included in the input signal, and
      a timing that is located at a symmetrical location of a path timing of one of two of the paths with reference to a path timing of the other path,
      wherein the timings are listed in the order of effectiveness of interference removal, and the timings are sequentially assigned to fingers for multiplying the weight from the highest ranked timing.

7. An interference reduction receiver, comprising:
   a signal correlation matrix obtaining unit configured to obtain a signal correlation matrix based on an input signal before being despread;
   a weight generating unit configured to generate weights by multiplying the signal correlation matrix of the input signal by a channel response vector; and
   a demodulating unit configured to demodulate a signal by despreading the input signal at a plurality of predetermined timings to obtain despread signals, multiplying the despread signals by the weights to obtain weight-multiplied signals, and adding the weight-multiplied signals, wherein
   the weight generating unit includes a RAKE weight generating unit, the RAKE weight generating unit configured to obtain a part of the weights by a RAKE method based on a part of the predetermined timings corresponding to impulse response generating delay times of paths included in the input signal, wherein the interference reduction receiver uses the part of the weights generated by the RAKE weight generating unit for the part of the predetermined timings corresponding to impulse response generating delay times of paths included in the input signal, and the remainder of the weights generated by the weight generating unit by multiplying the signal correlation matrix of the input signal by a channel response vector for the remainder of the predetermined timings.

8. An interference reduction receiver as claimed in claim 7, further comprising:
   a compensation RAKE weight generating unit configured to obtain a weight for level compensation by the RAKE method based on a predetermined timing corresponding to an impulse response generating delay time of one or more paths that are included in the input signal; and
   a compensation unit
      configured to calculate a ratio of an absolute value of a weight obtained by the weight generating unit based on the same timing to the weight obtained by the compensation RAKE weight generating unit, and
      configured to compensate for a level of the weight obtained by the weight generating unit.

9. The interference reduction receiver as claimed in claim 7, wherein
   a timing that is higher ranked in effectiveness of interference removal is assigned to the weight generating unit, which timing is selected from
   a timing that corresponds to an impulse response generating delay time of a signal of one or more paths, the signal being included in the input signal, and
   a timing that is located at a symmetric location of a path timing of one of two of the paths with reference to a path timing of the other path.

10. An interference reduction receiving method, comprising:
   obtaining a signal correlation matrix separate from despreading based on an input signal;
   generating weights by multiplying the signal correlation matrix of the input signal by a channel response vector; and
   demodulating a signal by despreading the input signal at a plurality of predetermined timings to obtain despread signals, multiplying the despread signals by the weights to obtain multiplied signals, and adding the multiplied signals;
   providing a time delay to the input signal in a delay unit, the time delay being equal to a difference between a first path timing and a second path timing;
   multiplying the input signal and an output signal of the delay unit in a multiplication unit;
   averaging an output signal of the multiplication unit to obtain components of the signal correlation matrix corresponding to the first path timing and the second path timing.

* * * * *